2,908,213

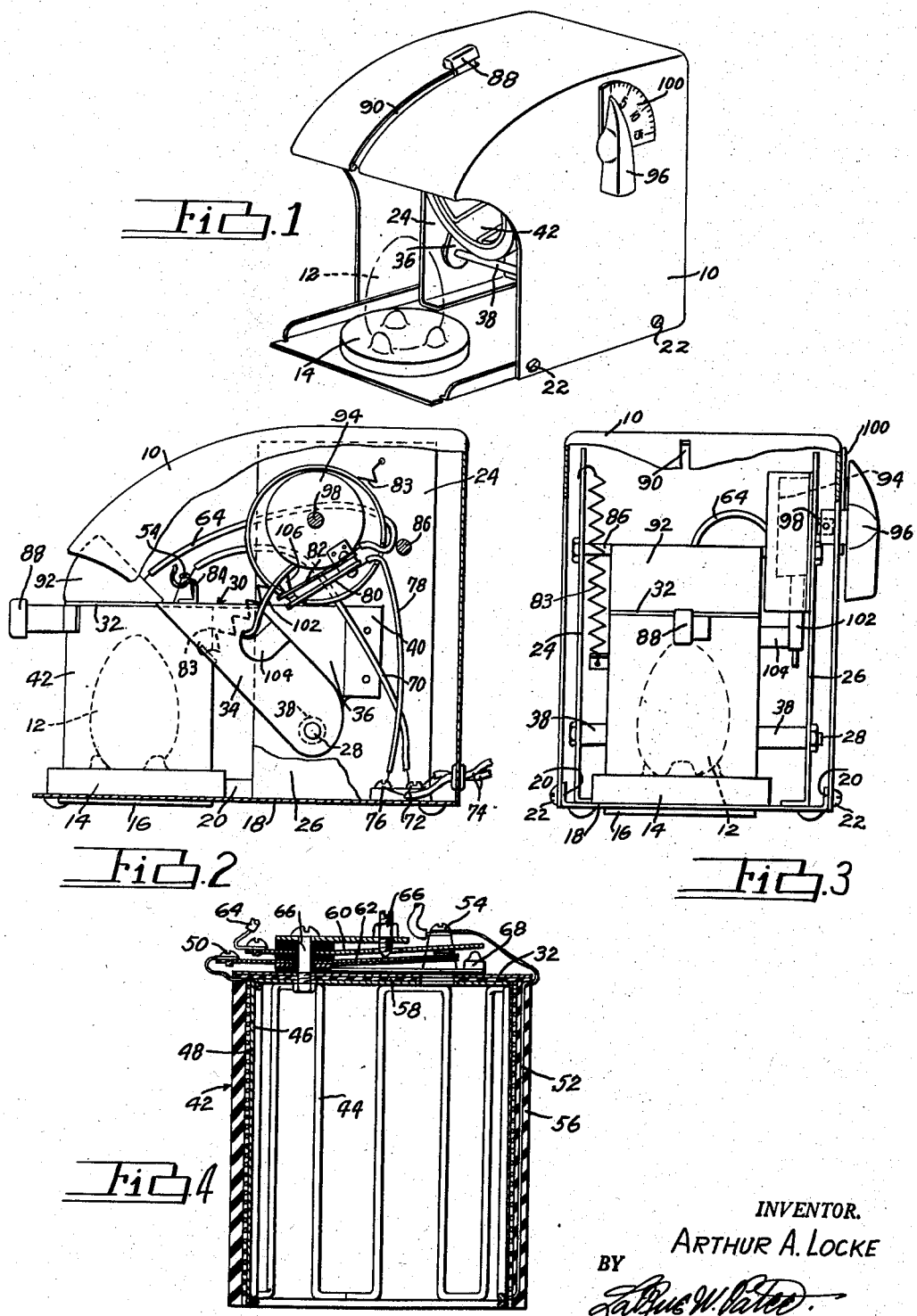

EGG COOKER

Arthur A. Locke, Algonac, Mich.

Application August 1, 1955, Serial No. 525,498

1 Claim. (Cl. 99—333)

This invention relates to an egg cooker and more particularly to a device for automatically cooking eggs by the direct application of heat supplied by an electrical current.

In cooking eggs by steaming or commonly used boiling in water method, moisture is forced through the pores of the shell. To overcome this objection, I have provided an automatic device for applying a dry heat to the egg for such a period of time which will produce either a soft or hard egg as if the egg was baked. The improved device permits the egg to remain on a support during the entire cooking period, to remove the danger of breaking the egg, and to provide automatic mechanism for moving the heating element toward and away from the egg.

Among the objects of my invention are to provide automatic means for cooking eggs; to provide means for cooking eggs in the shell without the use of water or steam; to provide means for cooking eggs which will automatically operate and position itself from start to completion of the cooking cycle without disturbance of the egg; to provide means for cooking eggs which will permit the use of a simple and compact device of attractive appearance, and being readily adapted for use on a breakfast table; to provide means for cooking eggs which can be used repeatedly in successive operations without impairment or without requiring special attention to the device; and to provide an egg cooker which will operate quickly, efficiently and economically for the purpose stated.

These and other objects and advantages will appear more fully in the following detailed description taken in connection with the accompanying drawings, in which:

Fig. 1 is a perspective view of my improved egg cooker, showing the heating element in its raised position;

Fig. 2 is a side view thereof, parts being broken away and in section, the heating element being shown in its lowered position as in egg cooking position;

Fig. 3 is a front view of Fig. 2, the casing being partly broken away and in section; and Fig. 4 is an enlarged sectional view of the heating element.

With reference to the drawings, I have shown an embodiment of my invention in the form of an egg cooker in which a single egg may be cooked, but it will be understood that any number of heating elements may be employed for any reasonable number of eggs to be cooked simultaneously.

The mechanism is encased in an outer hooded shell or covering 10. In accordance with conventional practice this covering may be chrome plated so as to enhance its appearance for table use, as an appliance on the order of toasters, and the like. As herein illustrated, the cover 10 is open at its front face for the reception of an egg 12, indicated by the broken line, which is received on a ceramic saucer 14, the latter having a dished upper surface with spaced upwardly extending projections for supporting the egg. The bottom of the saucer 14 is provided with a flange 16 which is received in an opening in the base plate 18 of the cover 10, to hold it in location.

The base plate 18 is provided with upwardly extending flanges 20 to which the side walls of the cover 10 are secured by screws 22, permitting removal of the cover from the operating mechanism which is secured to the base plate 18.

A pair of laterally spaced, vertically extending plates 24 and 26 are secured to the base plate 18 which support a horizontally disposed pivot rod 28 at the lower portion of the cooker. A bracket 30, having a central flange portion 32 and downwardly extending side flanges 34 and 36, is pivoted on the rod 28, being spaced thereon by spacer sleeves 38 between the flanges 34, 36, and plates 24, 26. The side flange 36 is extended beyond the rod 28 and a weight 40 is received thereon, to counterbalance the heating element which is secured to the central flange portion 32.

The heating element 42 is in the form of a crucible which is secured to central flange 32 of the bracket 30. This crucible 42 is shown in detail in Fig. 4. It comprises a wire frame 44 bent into a cylindrical wall which is wrapped with a layer of electric insulation material 46, such as mica or asbestos. Over this insulating material is wrapped a multiplicity of convolutions of electrical resistance wire 48; the wire starting at the terminal 50 and terminating through a wire 52, at a connection 54. A coating of insulation material 56 surrounds the wire 48. The cylindrical wall is closed at one end and an insulation 58 covers the outer closed end. The closed end of the crucible is secured to the central flange 32 of the bracket 30.

A thermostatic safety device, to prevent overheating, is mounted on the top of flange 32. It is desirable to initially heat the crucible 42 rapidly by means of the resistance wires 48. In so doing, it sometimes occurs that more heat is provided than is necessary during the remaining cooking cycle. The safety device provides for intermittently cutting off the current leading to the resistance wires. The safety device comprises two parallel contact blades 60 and 62 which are normally in contact to complete an electrical circuit from the lead wire 64 to the terminal 50 and are insulated from each other at their points of support on the top of flange 32 by the bolt 66. They are also insulated from the bolt. The blade 62 is formed of bimetal so as to be affected for movement toward or away from the blade 60 by variations in temperature. An adjustable stop 66 is provided for adjusting the normal position of the blade 62 toward or away from the blade 60. A stop 68 is provided for the blade 60 to hold it in position after the blade 62 has been moved away from contact by an excess of heat.

The connection 54, through lead wire 70, is connected to connector 72 which is connected to one of the main circuit lines 74. The other main circuit line 74 is connected to connector 76 and through lead wire 78 to one terminal 80 of a spring blade switch. The lead 64 is connected to the other terminal 82 of the spring blade switch. The switch blade 82 is normally in open circuit position, out of contact with the terminal 80, but is adapted to be flexed to make contact with the terminal 80 by the timing device, hereinafter more fully described.

As explained before, the bracket 30, carrying the heating element, is pivoted on the rod 28 and swings upwardly, as indicated in Fig. 1, by a tension spring 83. A stop means 84, carried by the central flange portion 32, limits the upwardly swinging movement of the bracket 30 by contacting a cross shaft 86 between the plates 24 and 26. A handle 88 is provided on the heating element which slides in a slot 90 in the cover 10. A shield 92 is provided on the central flange portion 32, to protect the terminals and the thermostatic safety device, located on top of the heating element 42.

The timing device comprises a clock mechanism or spring operated motor 94. This mechanism is of conventional type which utilizes a main spring, gearing system and a balance wheel (not shown). The clock works is wound by a hand operated knob 96 detachably received on the shaft 98 of the clock. A dial 100 is graduated to indicate the length of time desired. The amount of turning of the knob in a clockwise direction determines the cooking cycle from a range of from approximately two to fifteen minutes. A trip arm 102, actuated by the clock mechanism is normally in a raised position, shown by the dotted lines in Fig. 2, and the terminals 80 and 82 are disengaged. This normal position is when the knob 96 is at the zero position on the dial 100. When the knob 96 is turned clockwise the arm 102 is brought to the position shown in full lines in Fig. 2 where it retains the heating element in its down position by its engagement with a laterally extending latch 104. When the arm is in such position, an insulation member 106 carried by the arm, presses the contact terminal 82 into contact with the contact terminal 80 completing an electrical circuit through the heating element. When the knob returns to the zero position the arm 102 is released from engagement with the latch 104 and the spring 83 swings the bracket 30 and heating element 42 upwardly to the position shown in Fig. 1, disconnecting the electrical circuit to the heating element. Having the arm 102 controlling the switch blades 80 and 82, the heating element, at the time it is raised, is always disconnected from the electrical circuit.

When it is desired to cook an egg, the egg is placed on the bottom saucer 14 and the heating element 42 lowered over the egg by moving the handle 88 downwardly. While holding the heating element in this position, the knob is turned clockwise to the desired heating time indicated by its position with respect to the dial 100. This turning of the knob positions the arm 102 against the latch 104 to retain the heating element in position until the spring in the clock mechanism unwinds, releasing the arm 102.

When the arm 102 is down the terminals 80 and 82 are closed and the heating element is energized through closed terminals 60 and 62. The electrical current flows from one of the main leads 74, through lead wire 70 to the heating coil 48, bimetal contact blade 62, contact blade 60, lead wire 64, contacts 82 and 80, and back through lead wire 78 to the other main leads 74. It is to be understood that maximum heat is initially supplied and after a short interval of time the circuit is broken through thermostatic switch blades 60 and 62. This is to prevent overheating, but the clock mechanism continues to run. If the time interval is set for a longer period, the switch blades 60 and 62 may again close to provide further heating in the same cycle. When the egg is cooked, depending upon the desired hardness and the initial setting of the knob 96, the bracket 30 and the heating element 42 are released and the spring 83 draws the heating element upwardly, leaving the egg in its original position and free for removal from the cooker.

As thus shown and described, it is apparent that I have provided a novel arrangement of parts for cooking an egg in which, by a simple manual setting of the device and insertion of an egg on the cup member, a complete automatic operation takes place whereby the egg is cooked in accordance with a predetermined time interval with a control of heating temperature without effecting the time interval.

While I have shown a preferred embodiment of my invention, it is to be understood that it is susceptible of those modifications which appear obviously within the spirit of the invention and it is not my intention to limit its scope other than by the terms of the appended claim.

I claim:

A device in the form of a portable appliance for cooking eggs comprising, a hooded casing having a base, a support for an egg carried by said base, a swinging bracket pivotally supported within said hooded casing, an electrical heating element in the form of an open end cylinder member carried by said bracket, manually operable means for swinging said bracket and heating element downwardly whereby said heating element encloses the egg, resilient means for drawing said bracket and heating element upwardly away from the egg, a latch arm for engagement with said bracket for retaining said bracket in its down position, timing means for releasing said latch arm from said bracket, and electrical contacts for completing an electrical circuit to said heating element engageable by said latch arm when said latch arm is in engagement with said bracket and breaking the electrical circuit when said bracket is released from said latch arm by said timing means.

References Cited in the file of this patent

UNITED STATES PATENTS

| | | |
|---|---|---|
| Re. 18,566 | Smith | Aug. 9, 1932 |
| 1,719,931 | Hall | July 9, 1929 |
| 1,954,895 | Shenton | Apr. 17, 1934 |
| 1,959,935 | Shroyer | May 22, 1934 |
| 1,971,058 | Walder | Aug. 21, 1934 |
| 2,425,199 | Navon | Aug. 5, 1947 |
| 2,541,207 | Cole | Feb. 13, 1951 |
| 2,559,444 | Locke | July 3, 1951 |
| 2,562,991 | Rothschild | Aug. 7, 1951 |
| 2,659,802 | Garrett et al. | Nov. 17, 1953 |
| 2,729,733 | Heron | Jan. 3, 1956 |